US007319930B2

(12) United States Patent
Dietl et al.

(10) Patent No.: US 7,319,930 B2
(45) Date of Patent: Jan. 15, 2008

(54) METHOD FOR BALANCING OUT THE DIFFERENCES IN THE INJECTION QUANTITIES BETWEEN THE CYLINDERS IN AN INTERNAL COMBUSTION ENGINE

(75) Inventors: Roland Dietl, Regensburg (DE); Oliver Kastner, Donaustauf (DE); Hans-Peter Rabl, Kelheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/597,807

(22) PCT Filed: Feb. 1, 2005

(86) PCT No.: PCT/EP2005/050407

§ 371 (c)(1),
(2), (4) Date: Aug. 8, 2006

(87) PCT Pub. No.: WO2005/075806

PCT Pub. Date: Aug. 18, 2005

(65) Prior Publication Data

US 2007/0162215 A1 Jul. 12, 2007

(30) Foreign Application Priority Data

Feb. 9, 2004 (DE) ...................... 10 2004 006 294

(51) Int. Cl.
*F02D 41/24* (2006.01)
*F02D 41/14* (2006.01)
*F02M 51/00* (2006.01)
*G06F 17/00* (2006.01)

(52) U.S. Cl. ...................... 701/104; 123/436; 123/478; 701/115

(58) Field of Classification Search ................ 123/299, 123/300, 357, 436, 478, 480, 673, 674; 701/101-105, 701/109, 111, 115
See application file for complete search history.

(56) References Cited

U.S. PATENT DOCUMENTS 4,561,397 A * 12/1985 Tsukamoto et al. ......... 123/357

(Continued)

FOREIGN PATENT DOCUMENTS

| | | | |
|---|---|---|---|
| DE | 19720009 | A1 | 11/1998 |
| DE | 19855939 | A1 | 6/1999 |
| DE | 4122139 | C2 | 7/2000 |
| DE | 10012025 | A1 | 10/2001 |
| DE | 10233778 | A1 | 2/2004 |
| EP | 1132600 | A2 | 2/2001 |

OTHER PUBLICATIONS

International Search Report and Written Opinion for International Application No. PCT/EP2005/050407 (5 pages), May 10, 2005.

*Primary Examiner*—Willis R. Wolfe, Jr.
(74) *Attorney, Agent, or Firm*—Baker Botts L.L.P.

(57) ABSTRACT

In a method for equalizing the differences in injection quantities between the cylinders of a combustion engine, an adaptation of the differences in injection quantities, of the injection curves and of the hydraulic start of injection is carried out for different operating points of the combustion engine for at least one selected injection parameter. During this adaptation, the dynamics of a selected operating point are limited. The differences in injection quantities are determined for this selected operating point and are learned as adaptation values that are assigned to the respective injection parameter. In order to limit the dynamics, the injection parameter is set so that the selected operating point remains essentially stationary.

19 Claims, 2 Drawing Sheets

U.S. PATENT DOCUMENTS

| | | | | |
|---|---|---|---|---|
| 4,572,130 | A * | 2/1986 | Tsukamoto et al. | 123/357 |
| 4,590,907 | A | 5/1986 | Tsukamoto et al. | 123/357 |
| 5,385,129 | A | 1/1995 | Eyberg | 123/436 |
| 5,450,837 | A * | 9/1995 | Uchikawa | 123/692 |
| 6,401,703 | B1 * | 6/2002 | Mamiya et al. | 123/674 |
| 6,694,945 | B2 * | 2/2004 | Kawaguchi et al. | 123/299 |
| 6,755,176 | B2 * | 6/2004 | Takeuchi et al. | 123/299 |

* cited by examiner

METHOD FOR BALANCING OUT THE DIFFERENCES IN THE INJECTION QUANTITIES BETWEEN THE CYLINDERS IN AN INTERNAL COMBUSTION ENGINE

CROSS-REFERENCE TO RELATED APPLICATIONS

This application is a U.S. national stage application of International Application No. PCT/EP2005/050407 filed Feb. 1, 2005, which designates the United States of America, and claims priority to German application number DE 10 2004 006 294.3 filed Feb. 9, 2004, the contents of which are hereby incorporated by reference in their entirety.

TECHNICAL FIELD

The invention relates to a method for balancing out the differences in the injection quantities between the cylinders in an internal combustion engine.

BACKGROUND

In a multi-cylinder internal combustion engine there is a systematic error in the injection of fuel into the combustion chambers, due to variations, in particular, in the mechanical properties of the injection device, for example of the injectors in diesel engines with a common rail. The manufacturing tolerances for the components mentioned (different idle strokes) mean that, when actuated for the same length of time and with the same actuation energy, different quantities of fuel for combustion are fed to the individual cylinders. The different quantities of fuel lead to different power outputs from the individual cylinders which, apart from raising the running irregularity, also leads to an increase in the quantity of harmful exhaust gas components. In addition, differences in the idle stroke can invoke changes in the opening characteristics of the injectors. This manifests itself by differences in the start of the hydraulic injection between the individual injectors, and in the time-trace of the injection.

The underlying object of the invention is to specify a method of the type mentioned in the introduction which permits the actual systematic errors, which depend on the injection parameters, relevant for balancing out the cylinders to be determined in a simple way in terms of the injection quantities, the start of the hydraulic injection and the time-trace of the injection.

SUMMARY

In accordance with the invention, the method for balancing out the differences in injection quantities between the cylinders of an internal combustion engine carries out an adaptation of the injection quantity differences for at least one selected injection parameter. When doing so, the internal combustion engine will be at a selected operating point. Here, care must be taken to limit the dynamics of the selected operating point during the adaptation, because a changed value of the injection parameter would otherwise manifest itself as a braking or acceleration, not injected by the driver of the vehicle, and in any case as a new operating point, that is unstable conditions during the adaptation.

Next, the differences in injection quantities are determined for the selected operating point, and are learned as adaptation values which are assigned to the injection parameter value concerned. As has already mentioned above, care must be taken that the selected operating point remains essentially static. The second or additional injection parameters, as applicable, are here controlled as auxiliary variables, in such a way that the driver notices nothing of the adaptation process. Because only a few piston strokes are required for the adaptation, the engine control unit can also simply be adjusted so that the driver cannot terminate the static conditions during the critical adaptation phase, or only if the desired power, as called for by the driver via the throttle, exceeds some threshold.

The adaptation values which have been learned will preferably be used for the calculation of correction factors for individual cylinders, which are applied to an actuation parameter of an injection device on the internal combustion engine during the adaptation process and driving operation, for example as part of the control of running irregularity, in such a way as to effect a balancing out of the injection quantities, the start of the hydraulic injection and the time-trace of the injection.

Here, it has been found to be advantageous that the injection device for each cylinder takes the form of an injector with a piezo-electric actuator, for which the parameters used as the actuation parameters are the duration of actuation, the time point of actuation and/or the duration of the recharging time. It is thus possible, in particular for different values of the injection pressure, to carry out an adaptation of the valve lift required for the purpose of balancing out.

The method in accordance with the invention opens up in addition the possibility that, at the static operating point set for the purpose of adaptation, with balanced up injection quantities, the absolute value of the associated injection quantity is determined from a stored torque model of the internal combustion engine. A diagnosis of the absolute value of the injection quantity is precisely the critical factor, for the diagnosis of small injection quantities lying in the range of a few milligrams, for adherence to the limiting exhaust gas emission.

It has proved advantageous to set the start and the duration of the recharging of the piezo-electric actuator in such a way that the actuator signal (e.g. needle stop) which is generated should be effected for each injector at the same crankshaft angle, relative to upper working point for the piston concerned in the internal combustion engine.

It is thereby possible, by means of the actuator signal and a displacement of the time-point of actuation, to compensate completely for fluctuations in the injection quantity and also for differences in the start of the injection, due to manufacturing tolerances (e.g. idle stroke). This is particularly evident with pre- and post-injection.

BRIEF DESCRIPTION OF THE DRAWINGS

The invention is explained in more detail below by reference to diagrammatic drawings. These show.

DETAILED DESCRIPTION

Figure 1:
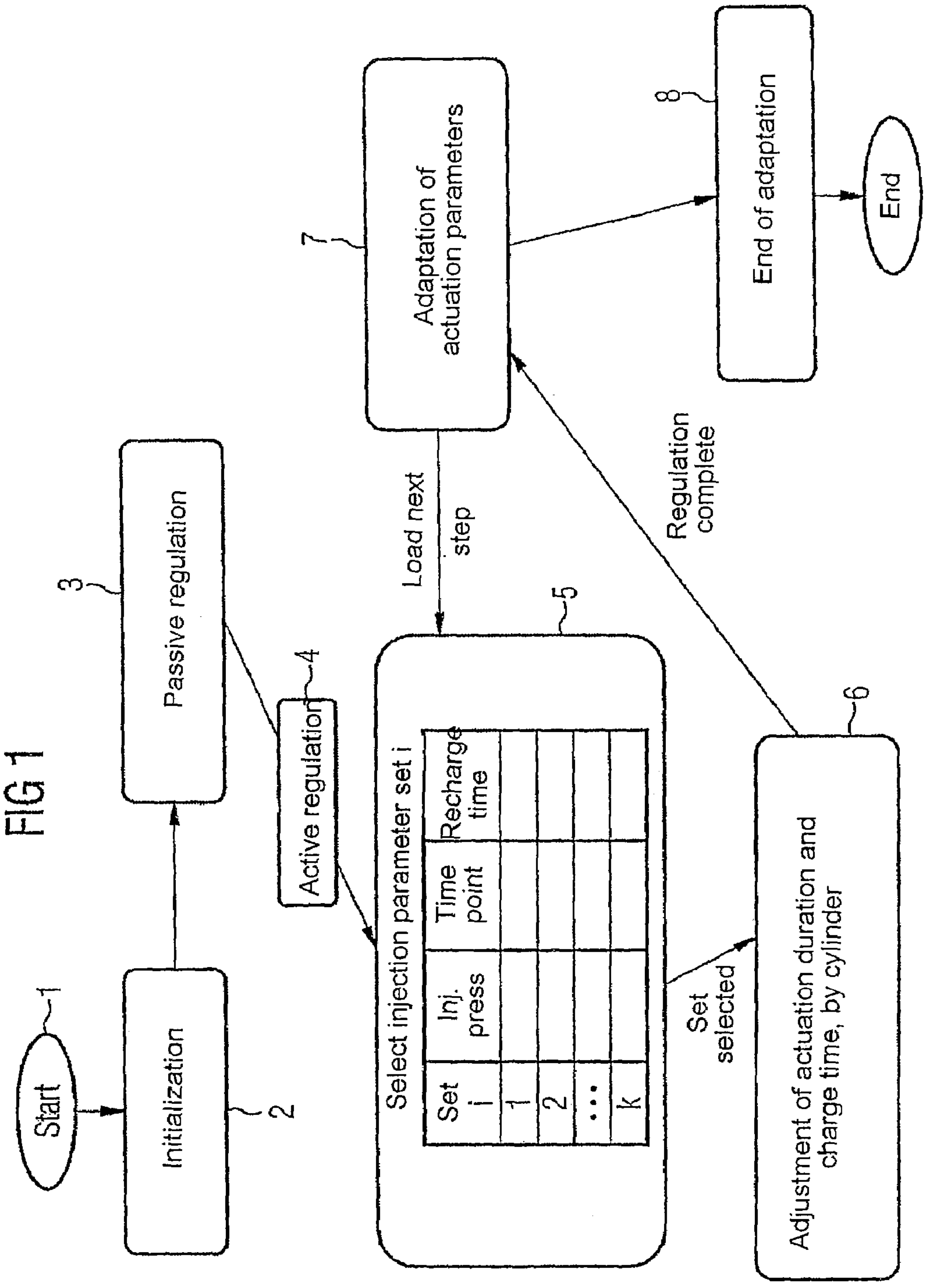
FIG. 1 a flow diagram for carrying out balancing out of the injection quantities in accordance with the invention.

In FIG. 1, after the start 1 of the balancing out of the injection quantity, there is an initialization phase 2 in the next step, in which the adaptation data stored in an earlier regulation cycle is loaded into an engine control unit (ECU, not shown). The initialization of a new regulation cycle can be effected both after every start operation for the internal combustion engine and also after certain prescribed time or maintenance intervals.

After the end of the initialization 2, a check is carried out on the activation conditions in a passive regulation step 3. This involves waiting until the preferred operating conditions are reached for the adaptation of certain injection parameter values. These conditions include for example the load, the rotational speed, or the coolant water temperature. For this purpose it may be necessary to modify the engine control unit so that, during the subsequent adaptation, the dynamics of the time changes of the operating point, chosen for the purpose of carrying out the adaptation cycle, are limited.

As soon as the activation conditions are increased (sic), the actual active regulation cycle 4 is started. Using the injection parameters 5 associated with the engine operation state, regulation 6 of the duration of actuation and the duration of the recharging time is carried out. As the result of this, the injection quantities for the individual injectors in the internal combustion engine are equalized with each other at a certain operating point, and the actuation signals for the various injectors are issued at the same point in time. Full details of this will be found below in the description of FIG. 2. An additional analysis possibility which is also available at this point in the process is to infer from a torque model, for the selected operating point with the given injection parameter values, the injection quantity which must apply according to the achieved torque.

After this, in step 7 (adaptation of the actuation parameters), further injection parameters or injection parameter sets i are loaded, as applicable, and the regulation 6 is carried out for each of these, with a determination of the injection quantity differences which exist at the set value of the selected injection parameter, or with balancing out by an appropriate correction factor for an actuation parameter, as applicable. For this adaptation, a suitable actuation parameter is selected, such as for example the duration of the actuation applied to the actuator and the duration of the recharging time. The resulting adaptation values are assigned to the injection parameter set, that is primarily the injection parameters such as for example the injection pressure and the duration of the injection, whose effect on the injection quantity differences is to be defined, and are stored away so that they can be called up later during driving operation for the purpose of directly balancing up the injection quantities without a regulation cycle. When the adaptation has been carried out for a sufficient number of checkpoints (typically 5 to 10), that is for example for all the i=1 to i=K set injection parameter values for the pressure, the end 8 of the adaptation or the ongoing regulation cycle, as applicable, is reached and the stored adaptation values can be used for equalizing the injection quantities in driving operation.

Figure 2A:
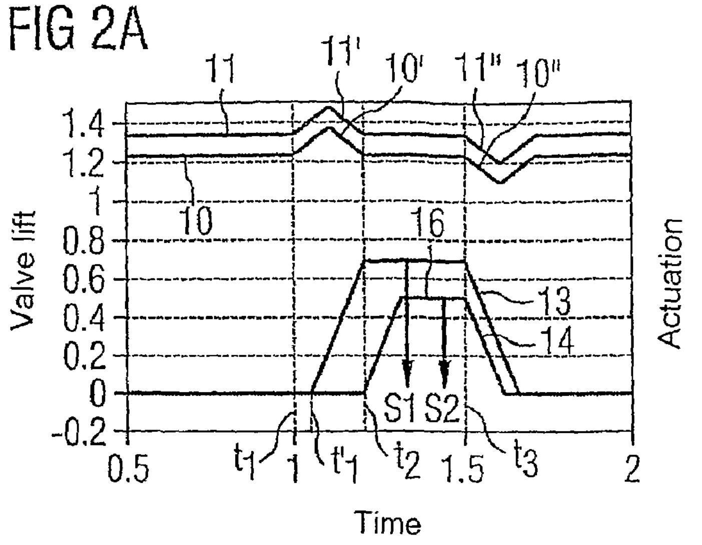
FIG. 2 actuation signals and valve lifts for two injectors with different adjustments.
Figure 2B:
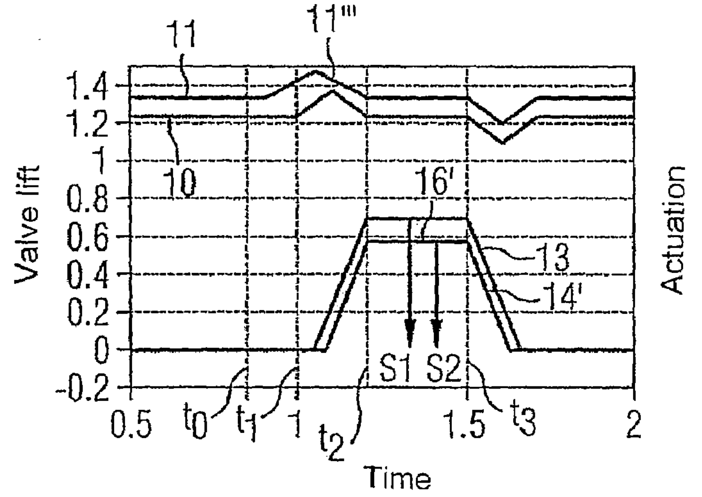
Figure 2C:
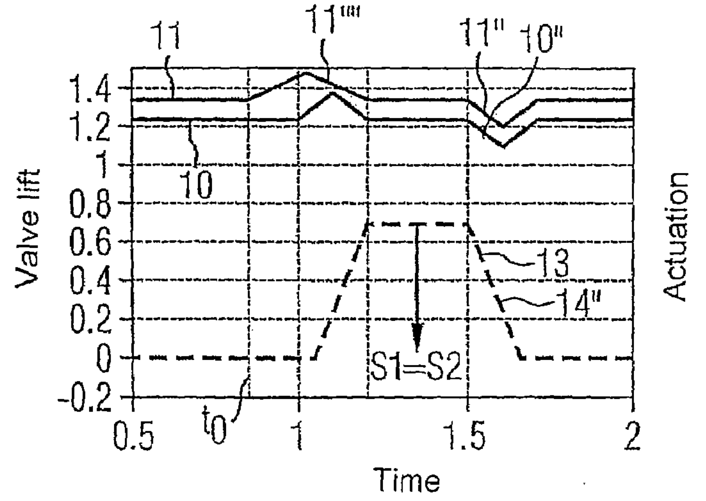

FIG. 2 shows the modifications to the actuator signals carried out in step 6 by changing the duration of actuation and duration of the recharging time. The upper parts of FIGS. 2A to C show two actuation signals for two injectors. To make it easier to show them, the actuation signals are plotted one above the other. In the lower part of the figures are plotted the valve lifts for the corresponding injectors.

In FIG. 2A, the injectors are actuated by identical actuation signals. The first injector receives the actuation signal 10, the second injector the actuation signal 11. Each actuation signal is made up of a (triangular-shaped) upward-pointing recharging signal 10' or 11' respectively, and a downward-pointing (triangular-shaped) discharging signal 10" or 11" respectively, which starts at $t_1$ and ends at $t_2$. As can be seen, the recharging durations 10' and 11' and the discharge durations 10" and 11" are identical. The time interval between the end of recharging and the start of discharging (the interval from $t_2$ to $t_3$) is unchanged in all the FIGS. 2A to 2C. As a result of manufacturing tolerances, the same actuation signals 10 and 11 produce different valve lifts for the injectors, as can be seen from signals 13 and 14. Here, valve lift 13 corresponds to the first injector and valve lift 14 to the second injector. When the maximum needle excursion is reached (needle stop for the jet needle), the actuator for the first injector generates an actuator signal S1, at a time point of approximately 1.3 time units. The actuator for the second injector generates an actuator signal S2 at approximately 1.4 time units. As can be seen, the valve on the second injector is raised by less than that on the first injector, in spite of the actuation signals being the same. In addition, the valve on the second injector is not raised until the point in time $t_2$, while this has occurred much earlier ($t'_1$) for the first injector. This delay is caused by the larger idle stroke of the second injector.

In FIG. 2B, the actuation signal for the second injector 11 is now somewhat altered, in that the recharging time is lengthened and the duration of the actuation time. This is achieved with the end of the recharging time remaining unchanged at $t_2$. The duration of the actuation time is made up of the charging times (durations of the recharging and discharging times) and the time interval between the two signals. The early start of the recharging operation leads to the idle stroke being completed sooner, and hence to a faster actuation of the valve. In addition, the longer charging operation has the effect of increasing the maximum valve lift (from 16 to 16'), i.e. from 40 μm to over 50 μm, as shown in FIGS. 2A and 2B. Also because of the alteration to the actuation signal for the second injector, the actuator signal S2 is displaced to an earlier point in time, so that the actuator signals S1 and S2 are then closer to each other than in FIG. 2A.

The sole difference from FIG. 2B to FIG. 2C is that the charging signal 11"" has again been lengthened (start now at $t_0$), without altering the end ($t_2$) of this charging signal. This of course lengthens the duration of the actuation. As a result of this particular charging signal 11"", the valve lift for the second injector takes place simultaneously with the valve lift of the first injector, so that the lifts in the lower part of FIG. 2C can no longer be separated. By modifying the durations of actuations and the durations of the recharging times, the valve lifts of the individual actuators can be adjusted so that the actuation signals S1 and S2 occur simultaneously. This simultaneity is to be understood as meaning that the actuation signal for the first injector occurs at a certain crankshaft angle for the piston, relative to top-dead-center for the piston, and correspondingly the actuation signal for the second injector occurs at the same crankshaft angle relative to top-dead-center for the piston.

During each regulation cycle 6, the last stored adaptation values or correction factors, as applicable, are overwritten by the newly determined ones, by which means account will be taken in particular of the aging symptoms which have occurred in the meantime for the injection device, which may lead to changes in the variations in respect of the injection quantities in the various combustion chambers.

Optionally it is possible, for the set operating state and from a knowledge of the engine operating state (temperature of the coolant water, active consumers), to read out from the torque model the absolute value of the injection quantity, and to use the injection quantities, say, for exact calibration of the characteristic data.

What is claimed is:

1. A method for balancing out the differences in the injection quantities between the cylinders in an internal combustion engine whereby, comprising the step of carrying out, for various operating points of the internal combustion engine, an adaptation of the differences in the injection quantities for at least one selected injection parameter, wherein the dynamics of a selected operating point are limited during the adaptation, and wherein the differences in the injection quantities are determined for the selected operating point and are learned as adaptation values which are assigned to the injection parameter value concerned, and for the purpose of limiting the dynamics the injection parameter is set in such a way that the selected operating point remains essentially static.

2. A method according to claim 1, wherein the durations of the discharge times of all the actuators are the same.

3. A method according to claim 1, wherein the selected operating point is located in the no-load, partial load or full load region.

4. A method according to claim 1, wherein the learned adaptation values are used in calculating correction values individual to each cylinder, which are applied to at least one actuation parameter of an injection device on the internal combustion engine in such a way as to effect a balancing out of the injection quantities, time-traces of the injections and the start of the hydraulic injection.

5. A method according to claim 4, wherein the injection device for each cylinder takes the form of an injector with a piezo-electric actuator, whereby the duration of the actuation, the time point of actuation and/or the duration of the recharging time are used as the actuation parameters.

6. A method according to claim 5, wherein for each cylinder the start of the discharge of the corresponding piezo-electric actuator takes place at the same crankshaft angle relative to top-dead-center for the corresponding piston of the internal combustion engine.

7. A method according to claim 5, wherein for each cylinder the end of the recharging of the corresponding piezo-electric actuator takes place at the same crankshaft angle relative to top-dead-center for the corresponding piston of the internal combustion engine.

8. A method according to claim 5, wherein the start and the duration of the recharging of the piezo-electric actuator are set in such a way that the actuator signal which is generated for each injector occurs at the same crankshaft angle relative to top-dead-center for the corresponding piston of the internal combustion engine.

9. A method for balancing out the differences in the injection quantities between the cylinders in an internal combustion engine whereby, comprising the steps of:

adapting, for various operating points of the internal combustion engine, the differences in the injection quantities for at least one selected injection parameter, limiting the dynamics of a selected operating point during the adaptation, determining the differences in the injection quantities for the selected operating point, learning the differences as adaptation values, assigning the adaptation values to the injection parameter value concerned, and for the purpose of limiting the dynamics, setting the injection parameter in such a way that the selected operating point remains essentially static.

10. A method according to claim 9, wherein the durations of the discharge times of all the actuators are the same.

11. A method according to claim 9, wherein the selected operating point is located in the no-load, partial load or full load region.

12. A method according to claim 9, wherein the learned adaptation values are used in calculating correction values individual to each cylinder, which are applied to at least one actuation parameter of an injection device on the internal combustion engine in such a way as to effect a balancing out of the injection quantities, time-traces of the injections and the start of the hydraulic injection.

13. A method according to claim 12, wherein the injection device for each cylinder takes the form of an injector with a piezo-electric actuator, whereby the duration of the actuation, the time point of actuation and/or the duration of the recharging time are used as the actuation parameters.

14. A method according to claim 13, wherein for each cylinder the start of the discharge of the corresponding piezo-electric actuator takes place at the same crankshaft angle relative to top-dead-center for the corresponding piston of the internal combustion engine.

15. A method according to claim 13, wherein for each cylinder the end of the recharging of the corresponding piezo-electric actuator takes place at the same crankshaft angle relative to top-dead-center for the corresponding piston of the internal combustion engine.

16. A method according to claim 13, wherein the start and the duration of the recharging of the piezo-electric actuator are set in such a way that the actuator signal which is generated for each injector occurs at the same crankshaft angle relative to top-dead-center for the corresponding piston of the internal combustion engine.

17. A system for balancing out the differences in the injection quantities between the cylinders in an internal combustion engine whereby, comprising:

means for adapting, for various operating points of the internal combustion engine, the differences in the injection quantities for at least one selected injection parameter, means for limiting the dynamics of a selected operating point during the adaptation, means for determining the differences in the injection quantities for the selected operating point, means for learning the differences as adaptation values, assigning the adaptation values to the injection parameter value concerned, and means for setting the injection parameter in such a way that the selected operating point remains essentially static.

18. A system according to claim 17, wherein the learned adaptation values are used in calculating correction values individual to each cylinder, which are applied to at least one actuation parameter of an injection device on the internal combustion engine in such a way as to effect a balancing out of the injection quantities, time-traces of the injections and the start of the hydraulic injection.

19. A system according to claim 18, wherein an injection device for each cylinder comprises the form of an injector with a piezo-electric actuator, whereby the duration of the actuation, the time point of actuation and/or the duration of the recharging time are used as the actuation parameters.

* * * * *